US008362951B2

(12) United States Patent
Farmer et al.

(10) Patent No.: US 8,362,951 B2
(45) Date of Patent: Jan. 29, 2013

(54) CARRIER PHASE PROCESSING IN DISCONTINUOUS SATELLITE POSITIONING SYSTEM TRACKING

(75) Inventors: Dominic Gerard Farmer, Los Gatos, CA (US); Lalitaprasad V. Daita, San Jose, CA (US); Jie Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 12/718,798

(22) Filed: Mar. 5, 2010

(65) Prior Publication Data

US 2011/0001666 A1    Jan. 6, 2011

Related U.S. Application Data

(60) Provisional application No. 61/222,797, filed on Jul. 2, 2009.

(51) Int. Cl.
*G01S 19/30* (2010.01)
*G01S 19/00* (2010.01)

(52) U.S. Cl. .................... 342/357.69; 342/357.2

(58) Field of Classification Search ............... 342/357.2, 342/357.4, 357.63, 357.69; 701/207, 213, 701/468, 469
See application file for complete search history.

(56) References Cited

U.S. PATENT DOCUMENTS

2007/0297542 A1    12/2007    Sullivan

FOREIGN PATENT DOCUMENTS

WO    WO2006057930         6/2006
WO    WO2006060605 A2     6/2006

OTHER PUBLICATIONS

"Understanding GPS Principles and Appiicalbne " Kaplan Elliot D. and Hegarty, Christopher J., Second Edition, Artech House. c. 2006. Sections 5.8 and 8.4.1.2 pp. 219-223 and pp. 399-400.
International Preliminary Report on Patentability—PCT/US2010/040951, The International Bureau of WIPO—Geneva, Switzerland, May 30, 2011.
International Search Report and Written Opinion—PCT/US2010/040951, International Searching Authority—European Patent Office, Nov. 4, 2010.

*Primary Examiner* — Dao Phan
(74) *Attorney, Agent, or Firm* — Arnold J. Gum

(57) ABSTRACT

Disclosed is an apparatus, system and method for location determination following a search discontinuity utilizing early sampling of a satellite positioning system signal to determine a common code phase offset, pseudorange rate and mode of location calculation.

84 Claims, 3 Drawing Sheets

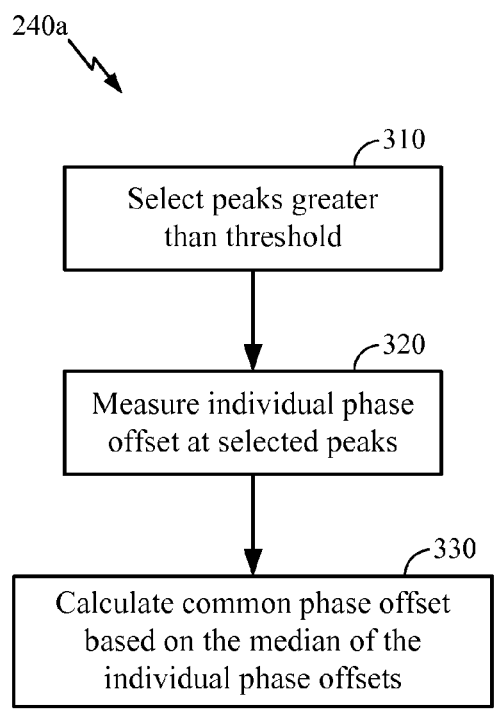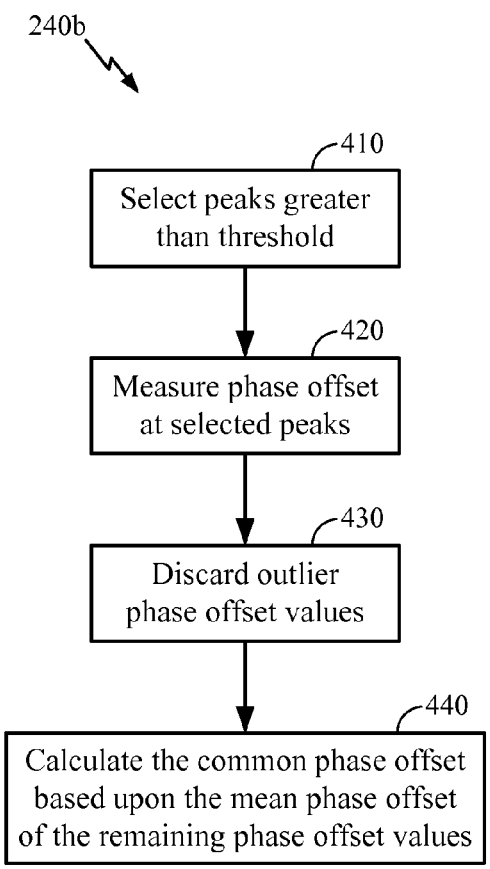
FIG. 3
FIG. 4

CARRIER PHASE PROCESSING IN DISCONTINUOUS SATELLITE POSITIONING SYSTEM TRACKING

CLAIM OF PRIORITY UNDER 35 U.S.C. §119

The present application for patent claims priority to Provisional Application No. 61/222,797 filed Jul. 2, 2009, and assigned to the assignee hereof and hereby expressly incorporated by reference herein.

FIELD

This disclosure relates generally to apparatus and methods for location determination and more particularly to early sampling during integration of satellite positioning system signals.

BACKGROUND

Various satellite positioning systems (SPS) may be used to determine the location of a mobile device. For example, Global Positioning System (GPS), GLONASS owned by the Russian Federation Government, and Galileo Radio Navigation Satellite System, are satellite systems that provide users equipped with a satellite positioning system receiver the ability to determine their location anywhere in the world. A satellite positioning system receiver determines its location by measuring the relative times of arrival of signals transmitted from multiple satellite positioning system satellites. During an ongoing satellite positioning system tracking session, the satellite positioning system receiver may also depend on prior state information for the satellite positioning system receiver and for the satellite positioning system satellites comprising position, velocity, and heading in determining the current location of the satellite positioning system receiver. Relying on prior state information, possibly through the use of a Kalman filter, may greatly increase accuracy in a linear moving situation. However, if the satellite positioning system tracking session is paused and restarted or, if the satellite positioning system is initiating a new tracking session, there is a satellite positioning system signal search discontinuity. In situations where there is a satellite positioning system signal search discontinuity, assumption of linear movement may introduce inaccuracy into a position calculation and prior state in formation may be stale or non-existent.

SUMMARY OF THE INVENTION

An aspect of the present invention may reside in a method to determine location, the method comprising: following a search discontinuity, integrating a satellite positioning system signal for time T2; sampling an at least one observable signal metric at a time T1, where time T1 is less than time T2; identifying peaks of the at least one observable signal metric; and solving for a common code phase offset.

Another aspect of the present invention may reside in an apparatus to determine location, the apparatus comprising a receiver configured to receive a satellite positioning system signal and a processor configured to: following a search discontinuity, integrate the satellite positioning system signal for time T2; sample at least one observable signal metric at a time T1, where time T1 is less than time T2; identify peaks of the at least one observable signal metric; and solve for a common code phase offset.

Another aspect of the present invention may reside in an apparatus for determining location, the apparatus comprising: means for receiving a satellite positioning system signal; means for, following a search discontinuity, integrating the satellite positioning system signal for time T2; means for sampling at least one observable signal metric at a time T1, where time T1 is less than time T2; means for identifying peaks of the at least one observable signal metric; and means for solving for a common code phase offset.

Another aspect of the present invention may in reside in a computer-readable storage medium comprising program code, to determine location, stored thereon, comprising: code for, following a search discontinuity, integrating a satellite positioning system signal for time T2; code for sampling an at least one observable signal metric at a time T1, where time T1 is less than time T2; code for identifying peaks of the at least one observable signal metric; and code for solving for a common code phase offset.

It is understood that other aspects will become readily apparent to those skilled in the art from the following detailed description, wherein various aspects are shown and described by way of illustration. The drawings and detailed description are to be regarded as illustrative in nature and not as restrictive.

BRIEF DESCRIPTION OF THE DRAWINGS

FIG. 3 shows a method of calculating a common code phase offset utilizing a median value according to an embodiment of the present invention.

FIG. 4 shows a method of calculating a common code phase offset utilizing a mean value according to another embodiment of the present invention.

DETAILED DESCRIPTION

Figure 1:
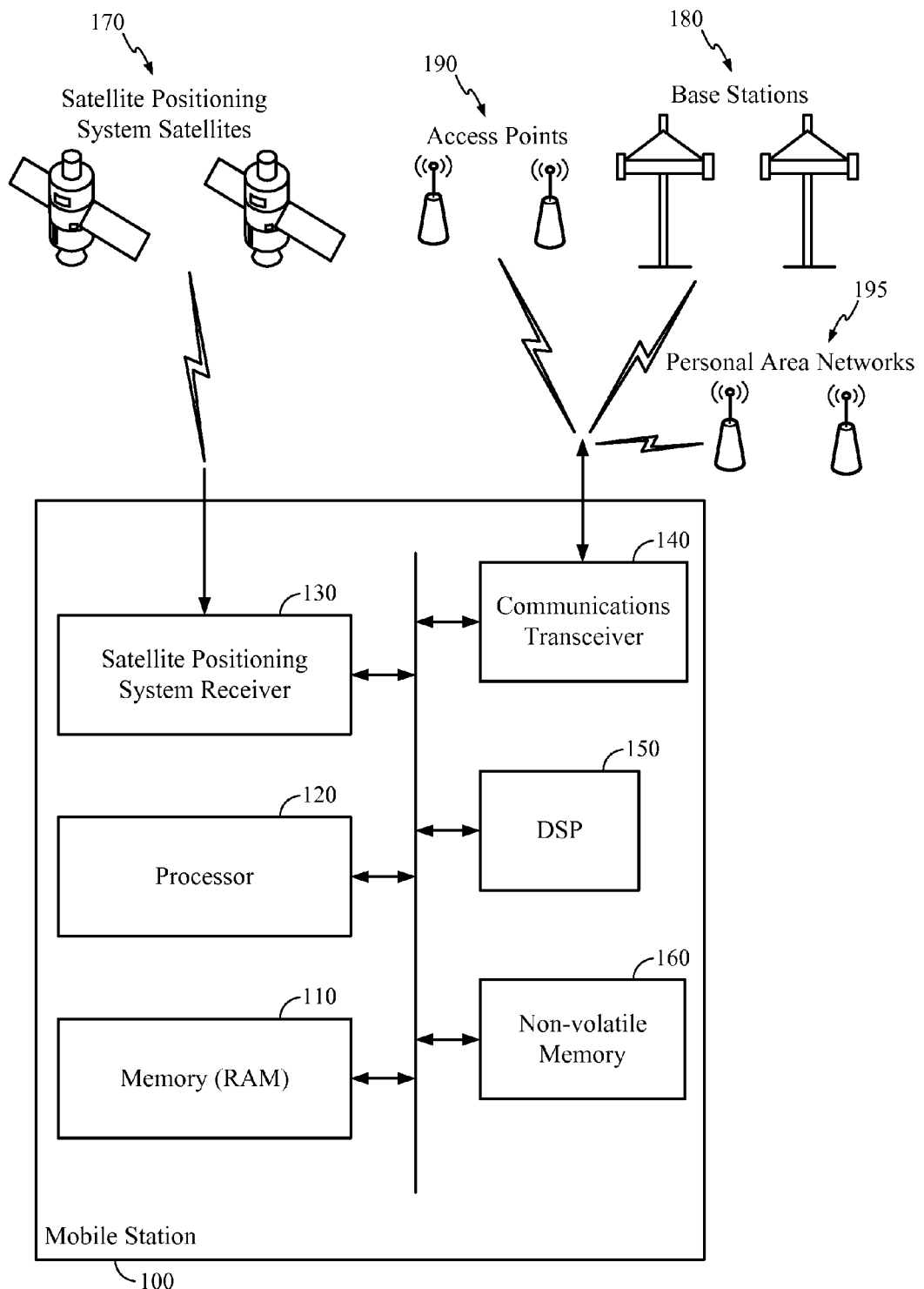
FIG. 1 shows a wireless communication system which includes one embodiment of a mobile station.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As used herein, Mobile Station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops. etc. which are capable of communication with a server, such as via the Internet, WiFi, or other network, and regardless of whether satellite signal reception, assistance data reception, and/or position-related processing occurs at the device, at a server, or at another device associated with the network. Other embodiments may include any operable combination of the above.

Where a satellite positioning system receiver experiences a satellite positioning system signal search discontinuity, a useful alternative to a pre-existing satellite positioning system tracking session, may be based upon determining whether the satellite positioning system receiver is stationary or in motion prior to calculating its location. An accurate user velocity estimate is useful to generate an accurate SPS receiver position estimate; this includes detecting whether the user is moving or stationary. Carrier phase processing, which generates accurate pseudorange rate estimates, can be utilized to derive very accurate user velocity. However, carrier phase processing normally requires that the signal be continuously tracked by the satellite positioning system receiver. After a search discontinuity, the receiver may experience a tracking disruption and may, therefore, not be able to track satellite signals continuously. For example, a search discontinuity may be caused by the SPS receiver circuitry being periodically turned off to save power. Powering off the SPS receiver circuitry may include turning off the SPS receiver clock during the search discontinuity to save power. Turning off the SPS receiver clock or allowing the SPS receiver clock to drift typically introduces a common phase offset into subsequent satellite positioning system measurements unless the common phase offset can be identified and corrected for. If the common phase offset can be identified, it may still be advantageous to obtain high accuracy pseudorange rate estimates via carrier phase processing. This invention discloses how to perform carrier phase processing after a search discontinuity and how to utilize the results to calculate the location of the SPS receiver.

FIG. 1 shows a block diagram of one embodiment of a Mobile Station (MS) 100. The MS 100 includes a Processor 120 coupled to and to coordinate interactions with a Communications Transceiver 140, a satellite positioning system Receiver 130, Memory 110, non-volatile memory 160 and a DSP 150.

In FIG. 1, Satellite Positioning System Receiver 130 receives and processes satellite positioning system signals from Satellite Positioning System Satellites 170. A satellite positioning system (SPS) typically includes a system of transmitters positioned to enable entities to determine their location on or above the Earth based, at least in part, on signals received from the transmitters. Such, a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or BeiDou may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for satellite positioning systems. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a satellite positioning system may include any combination of one or more global and/or regional navigation satellite systems and/or augmentation systems, and satellite positioning system signals may include satellite positioning system, satellite positioning system-like, and/or other signals associated with such one or more satellite positioning systems.

Continuing with FIG. 1, the Communications Transceiver 140 receives and transmits signals to ground-based transceivers comprising, but not limited to Base Stations 180, Access Points 190 and Personal Area Networks 195. Position determination techniques described herein may be implemented in conjunction with various wireless communication networks such as a wireless wide area network (WWAN), a wireless local area network (WLAN), and a wireless personal area network (WPAN). The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and a Long Term Evolution (LTE) network. A CDMA network may implement one or more radio access technologies (RATS) such as cdma2000. Wideband-CDMA (W-CDMA), and Time Division Synchronous Code Division Multiple Access (TD-SCDMA). Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

In FIG. 1, two Base Stations 180. Access Points 190 and Personal Area Networks 195 are illustrated; however, the number of Base Stations 180, Access Points 190 and Personal Area Networks 195 could be less or greater than two. It is recognized that satellite positioning system signal search and signal processing may be done in the DSP 150, the processor 120, in the Satellite Positioning System Receiver 130 via specialized signal search and signal processing circuitry or some combination thereof.

The Processor 120 operates the Communications Transceiver 140 to communicate with ground-based transceivers comprising, but not limited to Base Stations 180, Access Points 190 and Personal Area Networks 195.

The processor 120 operates the Satellite Positioning System Receiver 130 to receive satellite positioning system signals from satellite positioning system satellites comprising satellites from the GPS, Gallileo, GLONASS and Beidou satellite systems or other navigational satellite systems.

Figure 2:
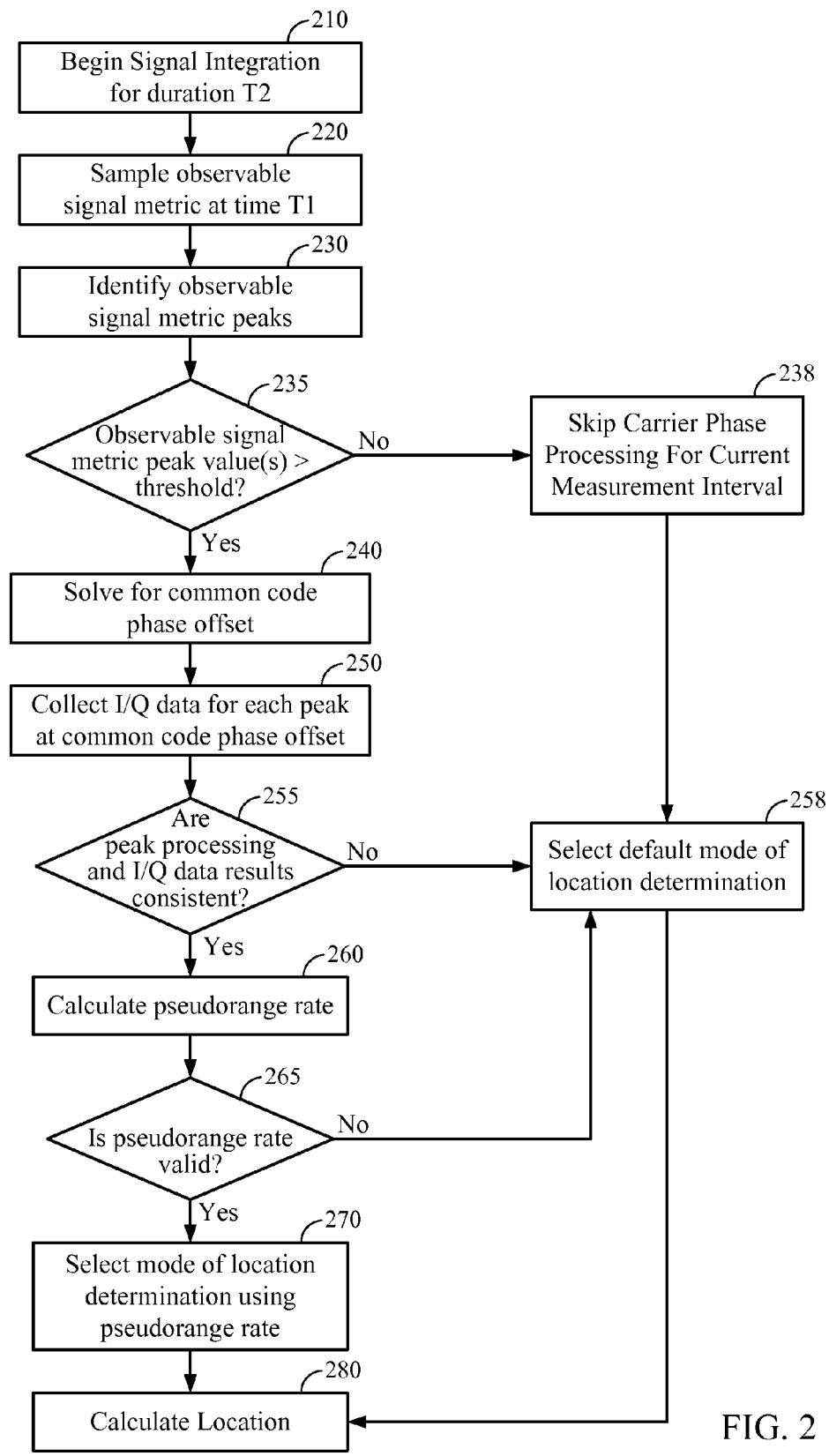
FIG. 2 shows a method of calculating location using early sampling to determine the technique used to calculate location according to an embodiment of the present invention.

FIG. 2 shows a flow diagram illustrating a method of carrier phase processing in discontinuous satellite positioning system tracking. In step 210, Begin Signal Integration, the MS 100 commences the integration of a satellite positioning system signal after a satellite positioning system signal search discontinuity. The period where satellite positioning system signals are not tracked may be of varying length; however, the period where satellite positioning system signals are not tracked is characterized by higher satellite positioning system receiver clock uncertainty, typically caused by the satellite positioning system receiver going into a lower power sleep mode state during periods where satellite positioning system search is not required.

Signal integration comprises integrating an observable signal metric, for example, signal energy. In alternative embodiments, the observable signal metric may be comprised of amplitude of observable signal or I/Q data.

The integrated values of the observable signal metric are charted against both phase offset and frequency. The integration continues for a period, T2, greater than or equal to 80 ms, for example, 200 ms, at which time the peaks of the observable signal metric are used to calculate a location and velocity of the MS 100. In step 220, the observable signal metric is also sampled at a time T1, shorter than T2 and less than or equal to 50 ms, for example, 20 ms. While typical examples of total integration time, T2, and early sample time, T1, are provided it is realized that other embodiments may use different values for T2 and T1, T1 being less than T2.

The sample of the observable signal metric at time T1 may be used to determine how satellite positioning system information will be processed at time T2. The mode of processing for the satellite positioning system information at time T2 is selected to calculate an accurate location of the MS 100 based, at least in part, upon information derived from the observable signal metric sampled at time T1. This process of early sampling to determine the most effective mode of location determination is illustrated in steps 220-290.

Integrating the observable signal metric results in peak values of the observable signal metric relative to code phase offset and frequency. Some of those peaks may correspond to satellite positioning system satellites while others may correspond to multipath signals, noise or jammers. Continuing with FIG. 2, in Step 230, the peaks of the observable signal metric, at time T1, are selected. The selected peaks of the observable signal metric, at time T1, are compared, in Step 235, to a predetermined threshold. If the observable signal metric is signal energy, the predetermined threshold is greater than 30 dBHz, for example, 33.5 dBHz. If none of the peaks of the observable signal metric exceed the predetermined threshold at time T1, carrier phase processing for the current measurement interval is skipped, as shown in Step 238, and the default mode of location determination is selected, as shown in Step 258.

If at least one peak of the observable signal metric exceeds the predetermined threshold at time T1, carrier phase processing for the current measurement interval continues in step 240. In step 240, a common code phase offset is solved for based upon the at least one peak of the observable signal metric that exceeds the predetermined threshold at time T1.

The common code phase offset, or SPS receiver clock offset, is the code phase offset at which I/Q data is summed for at least one peak of the at least one observable signal metric that exceed the predetermined threshold.

The common code phase offset may be solved for in various ways. One embodiment to solve for the common code phase offset is to select the individual offset of one peak of the observable signal metric that exceeds the threshold at time T1 and use it as the common code phase offset. This is most likely, if there is only one peak of the observable signal metric that exceeds the threshold at time T1 or, alternately, if the other peaks are outliers or are otherwise sub-optimal for use in calculating a common code phase offset.

Another embodiment to solve for the common code phase offset is to use the median value calculated from the individual code phase offsets as shown in FIG. 3. In step 310, the peaks of the observable signal metric that exceed the threshold at time T1, are selected. In step 320, the individual code phase offsets are measured at the selected peaks. In step 330, the common code phase offset is calculated based upon the median of the individual code phase offsets.

Another embodiment to solve for the common code phase offset is to use the mean value calculated from the individual code phase offsets as shown in FIG. 4. In step 410, the peaks of the observable signal metric that exceed the threshold at time T1, are selected. In step 420, the individual code phase offsets are measured at the selected peaks. In step 430, outlier phase offsets consisting of those with a greater deviation from the mean phase offset value are discarded or otherwise ignored for further calculations. In step 440, the common code phase offset is calculated based upon the mean of the remaining individual code phase offsets.

In still another embodiment, step 430 may be replaced by a weighting step where individual phase offset values close to the mean are weighted more heavily than phase offset values with greater deviation from the mean. In this embodiment, the common code phase offset is calculated based upon the weighted mean of the individual code phase offsets.

Other embodiments to utilize the individual code phase offsets to calculate the common code phase offset may be envisioned. Thus, the embodiments described above are not intended to be limiting.

Continuing with FIG. 2, once calculated, the common code phase offset is used in step 250 to determine the phase offset at which I/Q data is collected. Specifically, in step 250, I/Q data for each peak of the observable signal metric that exceeds the threshold at time T1 is summed at the common code phase offset. Collecting I/Q data at the common code phase offset eliminates the need to collect I/Q data across a broad range of phase offsets and significantly reduces the amount of memory and processing power required to analyze I/Q data.

In Step 255, the common code phase offset results predicted by the collected I/Q data are compared to results predicted by peak processing (PP) for consistency. For example, in one embodiment, the consistency check consists of comparing the I/Q sum collection bin code phase to the code phase predicted by peak processing. In this embodiment, (1) the I/Q slim collection code phase should be within +/−0.5 chips of the peak code phase reported by PP, and (2) the C/No reported by PP>30 dBHz. This is a per-SV test. The carrier phase processing is performed on that SV only when both criteria are satisfied.

If, in Step 255, the consistency check fails, a default mode of location calculation may be selected as disclosed in Step 258. In one embodiment, the default mode of location calculation may utilize pseudo-range rate calculated via peak processing rather then pseudo-range rate calculated via carrier phase processing.

If, in Step 255, the consistency check succeeds, carrier phase processing is performed on the collected I/Q data to calculate pseudorange rate for each satellite positioning system signal corresponding to each peak of the observable signal metric that exceeds the threshold at time T1, as illustrated in step 260. In one embodiment, the pseudorange rate, assuming T ms worth of 5 ms I/Q data, is calculated as follows:

1) Peak processing is used to generate the peak Doppler frequency estimate that corresponds to the T ms integration;
2) The coarse frequency of the I/Q data is estimated at the estimated peak frequency, as determined by peak processing, offset from the center frequency bin. The I/Q data is mixed with the coarse frequency, and sum four of the resulting 5 ms-I/Q data to obtain 20 ms I/Q sums.
3) Dot/cross product are generated. Estimate the bit from dot product. Perform cycle slip detection for each hit starting from the second bit.
4) Estimate the unwrapped phase for the 20 ms I/Q sums after modulation wipeoff. Advance each phase by 20 ms. Add all of them and get the full carrier phase.
5) Sample the phase at the beginning, middle, and ending bit, respectively
6) Use quadratic fitting to derive the pseudorange rate estimate from the 3 phase samples. Propagate if needed.

The pseudorange rate is checked for validity in Step 265. In one embodiment, the validity check is comprised of checking for the following conditions. When both conditions are met, the pseudorange rate may be used in Step 270.

1) Frequency estimate from DPO carrier phase processing is within +/−10 Hz of the frequency estimate from DPO integration; and
2) No cycle slip found during the DPO carrier phase processing interval.

In Step 270, the pseudorange rate is used to determine how the position of the MS 100 will be calculated. For example, location of the MS 100 may be calculated differently if the pseudorange rate predicts that the MS 100 is in motion versus if the pseudorange rate predicts that the MS is stationary. This embodiment does not limit the number or types of modes of location calculation available to the MS 100 in alternate embodiments.

In Step 280, the location is calculated using the mode of location calculation selected in either Step 258 or Step 270.

Assumptions and mathematical support for the described embodiment follows below.

Assume there are N hits worth of I/Q data available during the signal integration period, T2. For example, N=10 when the signal integration period is 200 ms.

The 5 ms I/Q sums are $R_I(k)$, $R_Q(k)$, k=1, 2, ..., 4*N. We can estimate the coarse frequency in this data as $f_\Delta$=(searcher rotator frequency during data collection)−(measured Doppler from peak processing)

Use the coarse frequency $f_\Delta$ to mix the 5 ms I/Q sums, then composite the 20 ms I/Q sums to obtain N 20 ms I/Q sums.

$$S_I(i) + j \cdot S_Q(i) = \sum_{k=1}^{4}(R_I(4i-4+k)+j \cdot R_Q(4i-4+k))\exp[-j2\pi f_\Delta(iT-T+kT_0)],$$

$$i = 1, \ldots, N$$

Cross product and dot product are as below:

$$CP(i)=S_I(i-1) \cdot S_Q(i)-S_Q(i-1) \cdot S_I(i)$$

$$DP(i)=S_I(i-1) \cdot S_I(i)-S_Q(i-1) \cdot S_Q(i)$$

The bit transition can be estimated $$\hat{c}(i)=\text{sign}[DP(i)]$$

The bit can be estimated $$\hat{d}(i)=\hat{c}(i) \cdot \hat{d}(i-1)$$

The phase increment from all the rotators is $$\theta(i)=\theta(i-1)+f_{BP}(i) \cdot T+f_{SRCH} \cdot T-f_\Delta \cdot T, i=1, \ldots, N$$

$$\theta(0)=0$$

The total carrier phase at bit index i is:

$$\phi(i)=\theta(i)-\{\text{unwrapped phase of } \hat{d}(i) \cdot (S_I(i)+j \cdot S_Q(i))\},$$
$$i=1, \ldots, N$$

Given 3 samples of φ(i), perform a quadratic fitting to estimate the frequency and acceleration.
(1) When N is even:
The 3 samples are taken:

$$\phi(1), \phi\left(\frac{N}{2}\right), \phi(N-1)$$

Assume $f_0$ is the instantaneous frequency at middle sample, and constant acceleration exists, we have $$\phi(1) = \phi\left(\frac{N}{2}\right) - \left(\frac{N}{2}-1\right)Tf_0 + 0.5a\left[\left(\frac{N}{2}-1\right)T\right]^2$$

$$\phi(N-1) = \phi\left(\frac{N}{2}\right) + \left(\frac{N}{2}-1\right)Tf_0 + 0.5a\left[\left(\frac{N}{2}-1\right)T\right]^2$$

The frequency at the middle sample is $$f_0 = \frac{\phi(N-1)-\phi(1)}{(N-2)T}$$

The acceleration is $$a = \frac{\phi(1)+\phi(N-1)-2\phi\left(\frac{N}{2}\right)}{\left[\left(\frac{N}{2}-1\right)T\right]^2}$$

$f_0$ points to the time $$\left(\frac{N}{2} - \frac{1}{2}\right)T.$$

To be consistent with the frequency estimate from integration (which point to $$\frac{N}{2}T),$$

we need to propagate $f_0$ forward by $$\frac{1}{2}T,$$

thus the carrier phase derived frequency is $$\hat{f} = f_0 + a \cdot \frac{T}{2}$$

(2) When N is odd:
The 3 samples are taken:

$$\phi(1), \phi\left(\frac{N+1}{2}\right), \phi(N)$$

Assume $f_0$ is the instantaneous frequency at middle sample, and constant acceleration exists, we have $$\phi(1) = \phi\left(\frac{N+1}{2}\right) - \left(\frac{N-1}{2}\right)Tf_0 + 0.5a\left[\left(\frac{N-1}{2}\right)T\right]^2$$

$$\phi(N) = \phi\left(\frac{N+1}{2}\right) + \left(\frac{N-1}{2}\right)Tf_0 + 0.5a\left[\left(\frac{N-1}{2}\right)T\right]^2$$

Thus the frequency at the middle sample is $$f_0 = \frac{\phi(N) - \phi(1)}{(N-1)T}$$

The acceleration is $$a = \frac{\phi(1) + \phi(N) - 2\phi\left(\frac{N+1}{2}\right)}{\left[\left(\frac{N-1}{2}\right)T\right]^2}$$

$f_0$ points to the time $$\left(\frac{N}{2}\right)T,$$

which is the same reference point of the frequency estimate from integration (which point to $$\frac{N}{2}T),$$

we do not need to do any propagation.

$\hat{f} = f_0$

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The invention claimed is:

1. A method to determine location, the method comprising:
    following a search discontinuity, integrating, by a mobile station, at least one observable signal metric of a satellite positioning system signal for a time T2;
    sampling, by the mobile station, the integrated at least one observable signal metric at a time T1, where the time T1 is shorter than the time T2;
    identifying, by the mobile station, peaks of the at least one observable signal metric subsequent to the sampling at the time T1 and before the time T2 has elapsed;
    solving, by the mobile station, for a common code phase offset based on the identified peaks;
    selecting, by the mobile station, a location determination mode based, at least in part, on the solved common code phase offset; and
    determining, by the mobile station, the location based, at least in part, on the integrated at least one observable metric of the satellite positioning system signal, integrated for the time T2, and the selected location determination mode.

2. The method of claim 1, wherein the time T1 is 50 ms or less.

3. The method of claim 2, wherein the time T1 is 20 ms.

4. The method of claim 1, wherein the time T2 is greater than or equal to 80 ms.

5. The method of claim 4, wherein the time T2 is 200 ms.

6. The method of claim 1, wherein the at least one observable signal metric is an amplitude.

7. The method of claim 1, wherein the at least one observable signal metric is I/Q data.

8. The method of claim 1, wherein the at least one observable signal metric is a signal energy.

9. The method of claim 1, wherein the at least one observable signal metric is a signal-to-noise ratio.

10. The method of claim 1, wherein at least one of the peaks of the at least one observable signal metric exceeds a predetermined threshold.

11. The method of claim 10, wherein the predetermined threshold is greater than or equal to 30 dBHz.

12. The method of claim 10, wherein individual code phase offsets are measured at the peaks of the at least one observable signal metric that exceed the predetermined threshold.

13. The method of claim 12, wherein the common code phase offset is derived from at least one of the individual code phase offsets.

14. The method of claim 13, wherein the common code phase offset comprises a mean of a plurality of the individual code phase offsets.

15. The method of claim 14, wherein the mean of the plurality of the individual code phase offsets does not utilize outlying phase offset values.

16. The method of claim 14, wherein the mean of the plurality of the individual code phase offsets is a weighted mean of a plurality of individual code phase offsets.

17. The method of claim 16, wherein the weighted mean of the plurality of individual code phase offsets utilizes weights at least partially based upon a signal-to-noise ratio.

18. The method of claim 13, wherein the common code phase offset comprises a median of a plurality of individual code phase offsets.

19. The method of claim 13, wherein I/Q data is collected at the common code phase offset.

20. The method of claim 19, wherein the I/Q data is checked for consistency.

21. The method of claim 20, wherein a pseudorange rate is calculated from the I/Q data.

22. The method of claim 21, wherein the pseudorange rate is checked for validity.

23. The method of claim 22, wherein the pseudorange rate is used to select a mode of location calculation.

24. The method of claim 23, wherein the mode of location calculation is utilized to determine the location of a mobile satellite positioning system receiver.

25. An apparatus to determine location, the apparatus comprising:
    a receiver configured to receive a satellite positioning system signal;
    a processor configured to:
        following a search discontinuity, integrate at least one observable signal metric of the satellite positioning system signal for a time T2;
        sample the integrated at least one observable signal metric at a time T1, where the time T1 is shorter than the time T2;
        identify peaks of the at least one observable signal metric subsequent to the sampling at the time T1 and before the time T2 has elapsed;
        solve for a common code phase offset based on the peaks;
        select a location determination mode based, at least in part, on the solved common code phase offset; and
        determine the location based, at least in part, on the integrated at least one observable metric of the satellite positioning system signal, integrated for the time T2, and the selected location determination mode.

26. The apparatus of claim 25, wherein the time T1 is 50 ms or less.

27. The apparatus of claim 26, wherein the T1 is 20 ms.

28. The apparatus of claim 25, wherein the T2 is greater than or equal to 80 ms.

29. The apparatus of claim 28, wherein the time T2 is 200 ms.

30. The apparatus of claim 25, wherein the at least one observable signal metric is an amplitude.

31. The apparatus of claim 25, wherein the at least one observable signal metric is I/Q data.

32. The apparatus of claim 25, wherein the at least one observable signal metric is a signal energy.

33. The apparatus of claim 25, wherein the at least one observable signal metric is a signal-to-noise ratio.

34. The apparatus of claim 25, wherein at least one of the peaks of the at least one observable signal metric exceeds a predetermined threshold.

35. The apparatus of claim 34, wherein the predetermined threshold is greater than or equal to 30 dBHz.

36. The apparatus of claim 34, wherein individual code phase offsets are measured at the peaks of the at least one observable signal metric that exceed the predetermined threshold.

37. The apparatus of claim 36, wherein the common code phase offset is derived from at least one of the individual code phase offsets.

38. The apparatus of claim 37, wherein the common code phase offset comprises a mean of a plurality of the individual code phase offsets.

39. The apparatus of claim 38, wherein the mean of the plurality of the individual code phase offsets does not utilize outlying phase offset values.

40. The apparatus of claim 38, wherein the mean of the plurality of the individual code phase offsets is a weighted mean of a plurality of individual code phase offsets.

41. The apparatus of claim 40, wherein the weighted mean of the plurality of individual code phase offsets utilizes weights at least partially based upon a signal-to-noise ratio.

42. The apparatus of claim 37, wherein the common code phase offset comprises a median of a plurality of individual code phase offsets.

43. The apparatus of claim 37, wherein I/Q data is collected at the common code phase offset.

44. The apparatus of claim 43, wherein the I/Q data is checked for consistency.

45. The apparatus of claim 44, wherein a pseudorange rate is calculated from the I/Q data.

46. The apparatus of claim 45, wherein the pseudorange rate is checked for validity.

47. The apparatus of claim 46, wherein the pseudorange rate is used to select a mode of location calculation.

48. The apparatus of claim 47, wherein the mode of location calculation is utilized to determine the location of a mobile satellite positioning system receiver.

49. An apparatus for determining location, the apparatus comprising:
 means for receiving a satellite positioning system signal;
 means for, following a search discontinuity, integrating at least one observable signal metric of the satellite positioning system signal for a time T2;
 means for sampling the integrated at least one observable signal metric at a time T1, where the time T1 is shorter than the time T2;
 means for identifying peaks of the at least one observable signal metric subsequent to the sampling at the time T1 and before the time T2 has elapsed;
 means for solving for a common code phase offset based on the peaks;
 means for selecting a location determination mode based, at least in part, on the solved common code phase offset; and
 means for determining the location based, at least in part, on the integrated at least one observable metric of the satellite positioning system signal, integrated for the time T2, and the selected location determination mode.

50. The apparatus of claim 49, wherein the T1 is 50 ms or less.

51. The apparatus of claim 50, wherein the time T1 is 20 ms.

52. The apparatus of claim 49, wherein the time T2 is greater than or equal to 80 ms.

53. The apparatus of claim 52, wherein the time T2 is 200 ms.

54. The apparatus of claim 49, wherein the at least one observable signal metric is an amplitude.

55. The apparatus of claim 49, wherein the at least one observable signal metric is I/Q data.

56. The apparatus of claim 49, wherein the at least one observable signal metric is a signal energy.

57. The apparatus of claim 49, wherein the at least one observable signal metric is a signal-to-noise ratio.

58. The apparatus of claim 49, wherein at least one of the peaks of the at least one observable signal metric exceeds a predetermined threshold.

59. The apparatus of claim 58, wherein the predetermined threshold is greater than or equal to 30 dBHz.

60. The apparatus of claim 58, wherein individual code phase offsets are measured at the peaks of the at least one observable signal metric that exceed the predetermined threshold.

61. The apparatus of claim 60, wherein the common code phase offset is derived from at least one of the individual code phase offsets.

62. The apparatus of claim 61, wherein the common code phase offset comprises a mean of a plurality of the individual code phase offsets.

63. The apparatus of claim 62, wherein the mean of the plurality of the individual code phase offsets does not utilize outlying phase offset values.

64. The apparatus of claim 62, wherein the mean of the plurality of the individual code phase offsets is a weighted mean of a plurality of individual code phase offsets.

65. The apparatus of claim 64, wherein the weighted mean of the plurality of individual code phase offsets utilizes weights at least partially based upon a signal-to-noise ratio.

66. The apparatus of claim 61, wherein the common code phase offset comprises a median of a plurality of individual code phase offsets.

67. The apparatus of claim 61, wherein I/Q data is collected at the common code phase offset.

68. The apparatus of claim 67, wherein the I/Q data is checked for consistency.

69. The apparatus of claim 68, wherein a pseudorange rate is calculated from the I/Q data.

70. The apparatus of claim 69, wherein the pseudorange rate is checked for validity.

71. The apparatus of claim 70, wherein the pseudorange rate is used to select a mode of location calculation.

72. The apparatus of claim 71, wherein the mode of location calculation is utilized to determine the location of a mobile satellite positioning system receiver.

73. A non-transitory computer-readable storage medium comprising program code, to determine location, stored thereon, comprising:
 code for, following a search discontinuity, integrating at least one observable signal metric of a satellite positioning system signal for a time T2;
 code for sampling the integrated at least one observable signal metric at a time T1, where the time T1 is shorter than the time T2;
 code for identifying peaks of the at least one observable signal metric subsequent to the sampling at the time T1 and before the time T2 has elapsed;
 code for solving for a common code phase offset based on the peaks;
 code for selecting a location determination mode based, at least in part, on the solved common code phase offset; and
 code for determining the location based, at least in part, on the integrated at least one observable metric of the satellite positioning system signal, integrated for the time T2, and the selected location determination mode.

74. The computer-readable storage medium of claim 73, wherein at least one of the peaks of the at least one observable signal metric exceeds a predetermined threshold.

75. The computer-readable storage medium of claim 74, wherein individual code phase offsets are measured at the peaks of the at least one observable signal metric that exceed the predetermined threshold.

76. The computer-readable storage medium of claim 75, wherein the common code phase offset is derived from at least one of the individual code phase offsets.

77. The computer-readable storage medium of claim 76, wherein I/Q data is collected at the common code phase offset.

78. The computer-readable storage medium of claim 77, wherein a pseudorange rate is calculated from the I/Q data.

79. The computer-readable storage medium of claim 78, wherein the pseudorange rate is used to select a mode of location calculation, wherein the mode of location calculation is utilized to determine the location of a mobile satellite positioning system receiver.

80. The method of claim 1, further comprising determining a location based on the common code phase offset.

81. The apparatus of claim 25, further comprising determining a location based on the common code phase offset.

82. The apparatus of claim 49, further comprising means for determining a location based on the common code phase offset.

83. The computer-readable storage medium of claim 74, wherein the program code further comprises code for determining a location based on the common code phase offset.

84. A method to determine location, the method comprising:
- discontinuing, by a mobile station, a search then beginning a new search to form a search discontinuity;
- following the search discontinuity and at the beginning of the new search, integrating, by the mobile station, an observable signal metric of a satellite positioning system signal for a time T2;
- sampling, by the mobile station, the integrated observable signal metric at a time T1, wherein the time T1 is shorter than the time T2;
- identifying, by the mobile station, a peak of the observable signal metric subsequent to the sampling at the time T1 and before the time T2 has elapsed;
- solving, by the mobile station, for a common code phase offset based on the peak;
- processing, by the mobile station, the satellite positioning system signal based on the common code phase offset; and
- determining, by the mobile station, a location based, at least in part, on the integrated at least one observable metric of the satellite positioning system signal, integrated for the time T2, and on the processed satellite position system signal.

* * * * *